United States Patent
Isherwood (10) Patent No.: US 9,720,645 B2
(45) Date of Patent: Aug. 1, 2017

(54) AUDIO OBSTRUCTION EFFECTS IN 3D PARALLAX USER INTERFACES

(71) Applicant: Intel Corporation, Santa Clara, CA (US)

(72) Inventor: David Isherwood, Tampere (FI)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/368,700

(22) PCT Filed: Dec. 27, 2013

(86) PCT No.: PCT/US2013/078029
§ 371 (c)(1),
(2) Date: Jun. 25, 2014

(87) PCT Pub. No.: WO2015/099774
PCT Pub. Date: Jul. 2, 2015

(65) Prior Publication Data
US 2016/0291930 A1    Oct. 6, 2016

(51) Int. Cl.
*G06F 3/16* (2006.01)
*G06F 3/01* (2006.01)
(Continued)

(52) U.S. Cl.
CPC .............. *G06F 3/167* (2013.01); *G06F 3/012* (2013.01); *G06F 3/017* (2013.01); *G06F 3/0304* (2013.01);
(Continued)

(58) Field of Classification Search
CPC .......... G06F 3/167; G06F 3/012; G06F 3/017; G06F 3/0304; G06F 3/0346;
(Continued)

(56) References Cited

U.S. PATENT DOCUMENTS 6,054,989 A  *  4/2000  Robertson ........... G06F 3/04815
                                                 715/727
6,166,738 A  *  12/2000 Robertson ........... G06F 3/04815
                                                 345/427
(Continued)

FOREIGN PATENT DOCUMENTS

| CN | 105934741 A | 9/2016 |
| EP | 2437505 A2 | 4/2012 |
| WO | WO-2015099774 A1 | 7/2015 |

OTHER PUBLICATIONS

"International Application Serial No. PCT/US2013/078029, International Preliminary Report on Patentability mailed Jul. 7, 2016", 7 pgs.

(Continued)

*Primary Examiner* — Thang Tran
(74) *Attorney, Agent, or Firm* — Schwegman Lundberg & Woessner, P.A.

(57) ABSTRACT

Various systems and methods for providing audio obstruction effects in 3D parallax user interfaces are described herein. An apparatus comprises: a presentation module to present a 3D parallax user interface on an electronic device, the 3D parallax user interface including a foreground layer and a background layer, the foreground layer having a foreground user interface component and the background layer having a background user interface component, the foreground user interface component obstructing at least a portion of the background user interface component; a receiving module to receive a signal to generate an audio notification for the background user interface component; and an audio effect module to: determine an audio effect to apply to the audio notification, the audio effect based on the position of the background user interface component in relation to the foreground user interface component; and apply the audio effect to the audio notification.

20 Claims, 4 Drawing Sheets (51) Int. Cl.
*G06F 3/03* (2006.01)
*G06F 3/0481* (2013.01)
*G06F 3/0346* (2013.01)
*G09G 3/00* (2006.01)

(52) U.S. Cl.
CPC ........ *G06F 3/0346* (2013.01); *G06F 3/04815* (2013.01); *G06F 3/165* (2013.01); *G09G 3/003* (2013.01)

(58) Field of Classification Search
CPC ...... G06F 3/04815; G06F 3/165; G06F 17/30; G09G 3/003; G10L 17/22; H04R 2430/00; H04R 2430/01; H04S 5/00; G06T 15/00; G06T 15/08
See application file for complete search history.

(56) References Cited

U.S. PATENT DOCUMENTS

| | | | | |
|---|---|---|---|---|
| 8,250,494 B2* | 8/2012 | Butcher | ................ | G06F 3/0482 345/173 |
| 2012/0057131 A1* | 3/2012 | Li | ................ | G02B 3/005 353/7 |
| 2012/0081361 A1* | 4/2012 | Woo | ................ | H04N 13/0425 345/419 |
| 2012/0192121 A1* | 7/2012 | Bonnat | ................ | G06F 3/0488 715/863 |
| 2013/0083024 A1* | 4/2013 | Li | ................ | H04N 13/007 345/426 |
| 2013/0141435 A1* | 6/2013 | Cho | ................ | G06T 15/50 345/426 |
| 2014/0195983 A1* | 7/2014 | Du | ................ | G06F 3/038 345/419 |
| 2014/0310630 A1* | 10/2014 | Asikainen | ................ | G01C 21/206 715/771 |
| 2014/0359442 A1* | 12/2014 | Lin | ................ | G06F 3/167 715/716 |
| 2016/0188181 A1* | 6/2016 | Smith | ................ | G06F 3/048 345/174 |

OTHER PUBLICATIONS

"International Application Serial No. PCT/US2013/078029, International Search Report mailed Sep. 30, 2014", 4 pgs.
"International Application Serial No. PCT/US2013/078029, Written Opinion mailed Sep. 30, 2014", 5 pgs.

* cited by examiner

AUDIO OBSTRUCTION EFFECTS IN 3D PARALLAX USER INTERFACES

This application is a U.S. National Stage Application under 35 U.S.C. 371 from International Application No. PCT/US2013/078029, filed on Dec. 27, 2013, which is hereby incorporated by reference in its entirety.

TECHNICAL FIELD

Embodiments described herein generally relate to audio processing and in particular, to audio obstruction effects in 3D parallax user interfaces.

BACKGROUND

Parallax is an optical phenomenon where the apparent position of an object viewed from two different lines of sight appears to move more when the object is closer to the viewpoint in contrast to objects that are farther from the viewpoint and appear to move less. In a computer user interface, parallax is exhibited when moving through a virtual three dimensional (3D) space. One mechanism to simulate parallax in a virtual 3D space when panning from side to side is to move foreground objects faster than objects in the distance to create depth.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

A parallax 3D user interface gives a perspective illusion of a three-dimensional space to a user when presented on a regular screen. When using a parallax 3D user interface, the user may physically move their head from side to side or provide an input to the user interface to change the viewpoint. When shifting the viewpoint, such as from side to side or moving up or down, the user interface objects that may be partially obscured behind foreground user interface objects may be brought into view.

If there are audio events, such as notifications, alarms, or alerts, that are associated with obscured components of the user interface, then the user may be confused regarding the source of such audio events. Also, if an audio event is presented in the foreground and another audio event is being provided by a component in the background, if the audio events are presented with equal prominence, the user may not be able to discern the source of the audio events. What is needed is a mechanism to distinguish audio events in a 3D user interface.

Figure 1A:
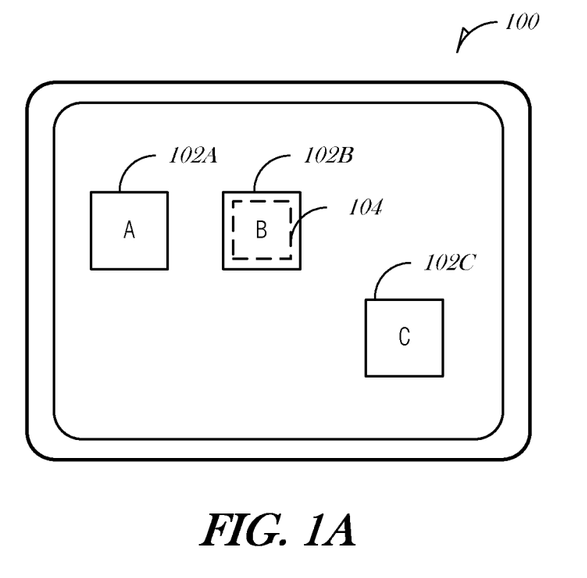
FIGS. 1A-C illustrate a three-dimensional parallax user interface, according to an embodiment.
Figure 1B:
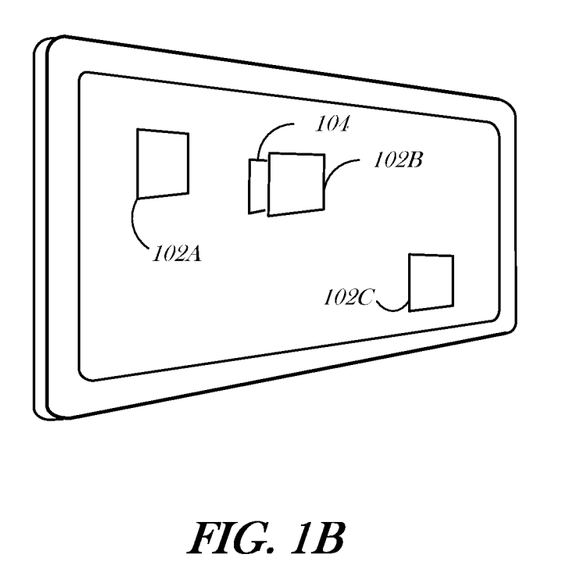
Figure 1C:
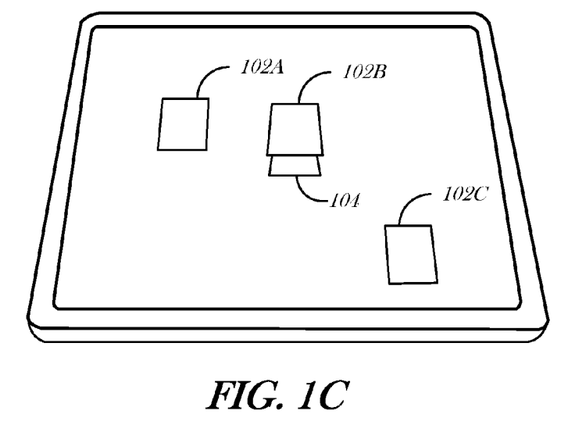

FIGS. 1A-C illustrate a three-dimensional parallax user interface 100, according to an embodiment. In FIG. 1A, the user interface 100 is viewed substantially head-on. The user interface 100 includes a plurality of user interface components 102A-C. The user interface components 102A-C may be icons, tiles, windows, dialog boxes, or other objects commonly found in a graphical user interface. In FIG. 1A, the user interface 100 is a parallax user interface. Thus, in FIG. 1A, there is a background user interface component 104, which is completely obscured by a foreground user interface component (e.g., the component 102B). In FIG. 1B, the user's perspective has been altered such that the user is viewing the user interface 100 from the left side of the display (left with respect to the user's point-of-view). From this viewpoint, the previously obscured component 104 is partially visible. FIG. 1C illustrates the user interface 100 from another perspective, namely from below. Again, from this viewpoint, the previously obscured component 104 is partially visible.

In the embodiments illustrated in FIGS. 1A-C, the user's viewpoint changes with respect to the user interface 100. Such viewpoint changes may be implemented in a number of ways. In an example, the user interface 100 may be displayed on a handheld device, such as a tablet computer, and the user may tilt, rotate, or otherwise alter the pitch, roll, or yaw of the attitude of the device. To accomplish the first implementation, the device may be equipped with an accelerometer, a gyrometer, or other sensors to detect the velocity, acceleration, and relative position of the device presenting the user interface.

In an example of a viewpoint change implementation, the user interface 100 may be displayed on a relatively stationary device, such as a wall-mounted monitor, and the user may alter the viewpoint by physically moving their head left, right, up, or down with respect to a central position on the user interface 100 (e.g., the center of the display). A camera or other sensor may be used to detect the user's position with respect to the device. Such a camera, or a plurality of cameras, may be used to accomplish the second implementation. For example, one or more cameras may detect a user's face and track the user's face with respect to the center of the user interface 100.

In a 3D parallax user interface, such as one illustrated in FIGS. 1A-C, the user interface components 102A-C may be presented on various layers. When shifting the viewpoint, the front-most layer (e.g., foreground layer) may be animated as moving faster than lower layers (e.g., background layers). A 3D parallax user interface may include two or more layers with any layer other than the foreground layer being referred to as a background layer. In the example illustrated in FIGS. 1A-C, two layers are shown with background user interface component 104 being in the background layer.

Figure 2:
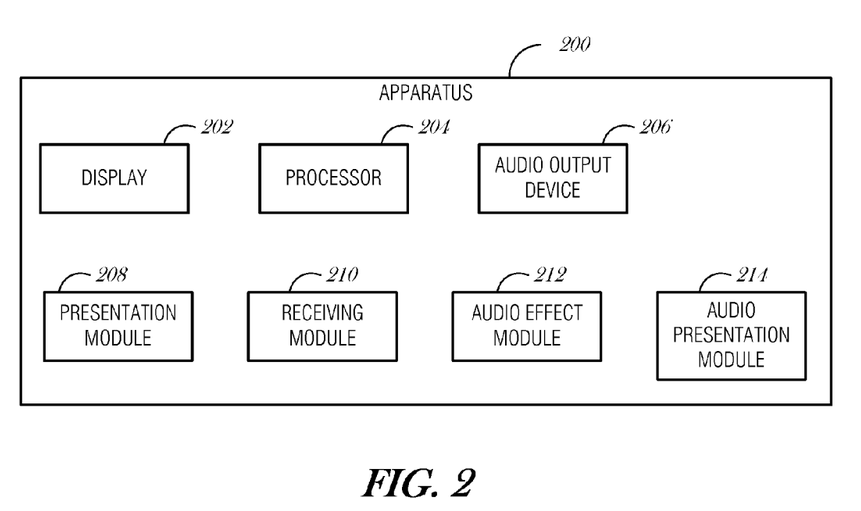
FIG. 2 is a block diagram of an apparatus to present audio obstruction effects in a 3D parallax user interface, according to an embodiment.

FIG. 2 is a block diagram of an apparatus 200 to present audio obstruction effects in a 3D parallax user interface, according to an embodiment. The apparatus 200 includes a display 202, a processor 204, and an audio output device 206. The display 202 may be any type of display device, including but not limited to a cathode ray tube (CRT) display, liquid crystal display (LCD), a plasma display, an organic light-emitting diode (OLED) display, or a light-emitting diode (LED) display. The processor 204 may be any type of processor including but not limited to a single-core processor, a dual-core processor, a quad-core processor, or the like. The audio output device 206 includes one or more electroacoustic transducers that produce sound in response to an electrical audio signal input.

The apparatus 200 also includes several modules including a presentation module 208, a receiving module 210, an audio effect module 212, and an audio presentation module 214. The presentation module 208 may be used to present a user interface on the display 202. In particular, the presentation module 208 may present a 3D parallax user interface on an electronic device (e.g., apparatus 200), the 3D parallax user interface including a foreground layer and a background layer, the foreground layer having a foreground user interface component and the background layer having a background user interface component, the foreground user interface component obstructing at least a portion of the background user interface component.

The receiving module 210 may receive a signal to generate an audio notification for the background user interface component. The signal may be generated by an application and transmitted to an operating system. The operating system may then broadcast that a notification should occur, and the receiving module 210 may intercept the operating system's broadcast and act on it. The audio notification may be various types of audio notifications including, but not limited to an alarm, an alert, a reminder, a system alert, or the like.

The audio effect module 212 may determine an audio effect to apply to the audio notification, the audio effect based on the position of the background user interface component in relation to the foreground user interface component. The audio effect module 212 may then apply the audio effect to the audio notification.

In an embodiment, the audio effect includes dampening an audio signal to reduce at least one of a volume or frequency range. In an embodiment, the volume is reduced by approximately 3 dB. In a further embodiment, to reduce the frequency range, the audio effect includes a reduction in the slope of a low-pass filter by approximately 6 dB/octave. In a further embodiment, the audio effect includes a reduction of the cut-off frequency of a low-pass filter by approximately 500 Hz. In another embodiment, the audio effect includes a reverberation or an echo.

To determine the audio effect to apply to the audio notification, the audio effect module 212 may determine an amount of unobstructed area of the background user interface component. For example, a background user interface component may be a window with dimensions of 300 pixels by 200 pixels, for a total area of 60,000 pixels$^2$. Using a linear correlation, when 20,000 pixels$^2$ are visible from behind the foreground user interface component, then the volume of the audio notification may be increased from a base value (when the background user interface component is completely obscured) to something louder to correspond with the increased visible area.

Then the audio effect module 212 may determine a distance from the foreground layer. Distance in this context is the number of layers separating the foreground layer from the background layer associated with the background user interface component emanating the audio notification. For example, in a 3D parallax user interface with five layers, an audio notification may be generated from a user interface component at the fourth layer deep (three layers behind the foreground layer). As such, the audio effect used may reduce the volume (e.g., amplitude of air pressure at speaker), increase static or other interference noises, add distortion, filter high-frequency bands, or the like to simulate that the audio notification is coming from a farther distance. Audio notifications that are generated at the second layer (the layer just behind the foreground layer), may have louder, clearer, or more robust sound in comparison. Using this information, the audio effect module 212 may construct the audio effect as a function of the amount of unobstructed area and the distance from the foreground layer.

The audio presentation module 214 may present the audio notification.

In an embodiment, the audio effect module 212 may determine that the foreground user interface component has moved to a new position with respect to the background user interface component in the 3D parallax user interface. Then the audio effect module 212 may determine a revised audio effect to apply to the audio notification, the revised audio effect based on the new position and apply the revised audio effect to the audio notification to obtain a revised audio notification. The audio presentation module 214 may then present the revised audio notification, such as via the audio output device 206. Thus, when a user is viewing the 3D parallax user interface and an audio notification is presented, emanating from a background user interface component, the user may move their head or angle the device to view the background layers. When the background user interface component that is emanating the audio notification comes into view, the audio notification may be altered to correspond with the presentation. For example, the audio notification may be presented as clearer, louder, or have a larger frequency spectrum to indicate that it is less obstructed or unobstructed by foreground objects.

In many user interfaces, the user is provided with a mechanism to change the desktop background (e.g., wallpaper) to display active content, such as movies, animations, webpages, or other multimedia content. The desktop background is the lowest-most layer. When active content with a soundtrack is being presented behind other windows or user interface components in foreground layers, the desktop background audio may be modified to indicate it being obscured. Thus, in an embodiment, the background layer is a wallpaper of the 3D parallax user interface. In a further embodiment, the wallpaper includes a soundtrack, and the audio effect module 212 may determine and apply an audio effect to apply to the soundtrack.

Figure 3:
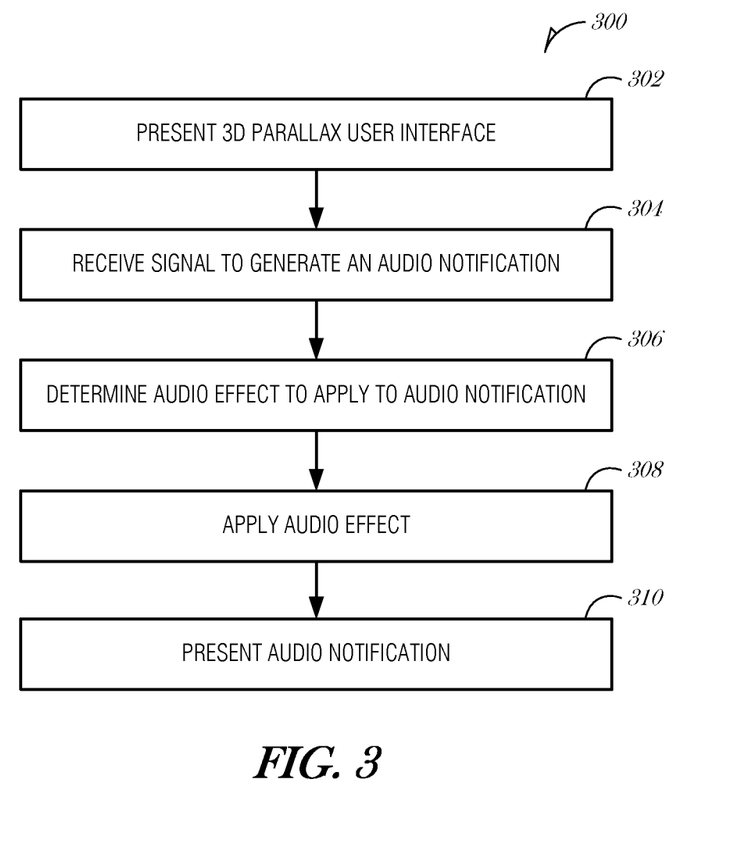
FIG. 3 is a flowchart illustrating a method for providing audio obstruction effects in 3D parallax user interfaces, according to an embodiment.

FIG. 3 is a flowchart illustrating a method 300 for providing audio obstruction effects in 3D parallax user interfaces, according to an embodiment. At block 302, a 3D parallax user interface is presented on an electronic device, the 3D parallax user interface including a foreground layer and a background layer, the foreground layer having a foreground user interface component and the background layer having a background user interface component, the foreground user interface component obstructing at least a portion of the background user interface component.

At block 304, a signal to generate an audio notification for the background user interface component is received.

At block 306, an audio effect to apply to the audio notification is determined, the audio effect based on the position of the background user interface component in relation to the foreground user interface component.

In an embodiment, determining the audio effect to apply to the audio notification comprises determining an amount of unobstructed area of the background user interface component, determining a distance from the foreground layer, and constructing the audio effect as a function of the amount of unobstructed area and the distance from the foreground layer.

In an embodiment, the audio effect includes dampening an audio signal to reduce at least one of a volume or frequency range. In an embodiment, the volume is reduced by approximately 3 dB. In a further embodiment, to reduce the frequency range, the audio effect includes a reduction in the slope of a low-pass filter by approximately 6 dB/octave. In a further embodiment, the audio effect includes a reduction of the cut-off frequency of a low-pass filter by approximately 500 Hz. In another embodiment, the audio effect includes a reverberation or an echo.

At block 308, the audio effect is applied to the audio notification.

At block 310, the audio notification is presented.

In an embodiment, the method 300 includes determining that the foreground user interface component has moved to a new position with respect to the background user interface component in the 3D parallax user interface, determining a revised audio effect to apply to the audio notification, the revised audio effect based on the new position, applying the revised audio effect to the audio notification to obtain a revised audio notification, and presenting the revised audio notification.

In an embodiment, the background layer is a wallpaper of the 3D parallax user interface. In a further embodiment, the wallpaper includes a soundtrack, and the method 300 further comprises determining and applying an audio effect to apply to the soundtrack.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 4:
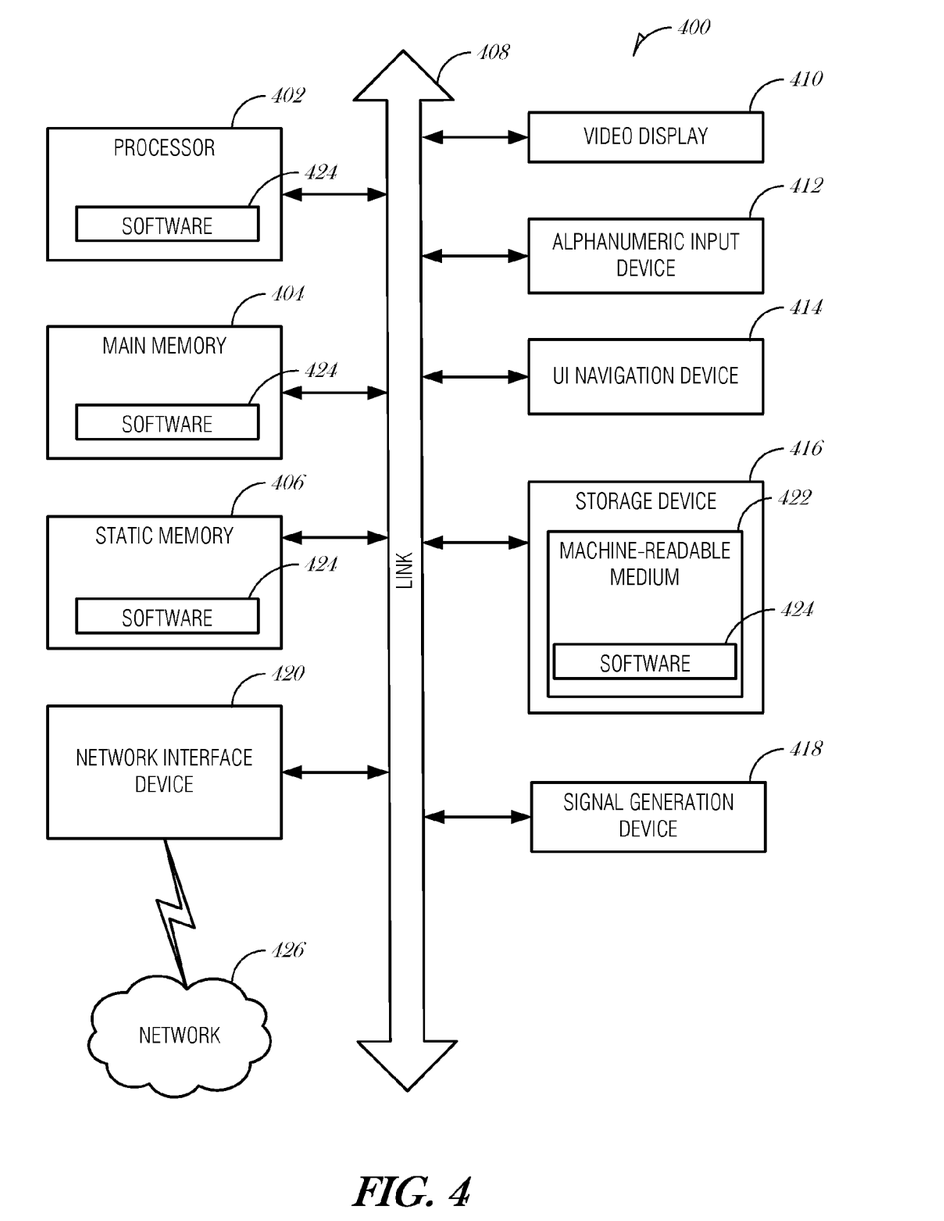
FIG. 4 is a block diagram illustrating an example machine upon which any one or more of the techniques (e.g., methodologies) discussed herein may perform, according to an example embodiment.

FIG. 4 is a block diagram illustrating a machine in the example form of a computer system 400, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 400 includes at least one processor 402 (e.g., a central processing unit (CPU), a graphics processing unit (GPU) or both, processor cores, compute nodes, etc.), a main memory 404 and a static memory 406, which communicate with each other via a link 408 (e.g., bus). The computer system 400 may further include a video display unit 410, an alphanumeric input device 412 (e.g., a keyboard), and a user interface (UI) navigation device 414 (e.g., a mouse). In one embodiment, the video display unit 410, input device 412 and UI navigation device 414 are incorporated into a touch screen display. The computer system 400 may additionally include a storage device 416 (e.g., a drive unit), a signal generation device 418 (e.g., a speaker), a network interface device 420, and one or more sensors (not shown), such as a global positioning system (GPS) sensor, compass, accelerometer, or other sensor.

The storage device 416 includes a machine-readable medium 422 on which is stored one or more sets of data structures and instructions 424 (e.g., software) embodying or utilized by any one or more of the methodologies or functions described herein. The instructions 424 may also reside, completely or at least partially, within the main memory 404, static memory 406, and/or within the processor 402 during execution thereof by the computer system 400, with the main memory 404, static memory 406, and the processor 402 also constituting machine-readable media.

While the machine-readable medium 422 is illustrated in an example embodiment to be a single medium, the term "machine-readable medium" may include a single medium or multiple media (e.g., a centralized or distributed database, and/or associated caches and servers) that store the one or more instructions 424. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes & Examples

Example 1 includes subject matter (such as a device, apparatus, or machine) comprising an apparatus to provide audio obstruction effects in 3D parallax user interfaces, the apparatus comprising: a presentation module to present a 3D parallax user interface on an electronic device, the 3D parallax user interface including a foreground layer and a background layer, the foreground layer having a foreground user interface component and the background layer having a background user interface component, the foreground user interface component obstructing at least a portion of the background user interface component; a receiving module to receive a signal to generate an audio notification for the background user interface component; and an audio effect module to: determine an audio effect to apply to the audio notification, the audio effect based on the position of the background user interface component in relation to the foreground user interface component; and apply the audio effect to the audio notification; and an audio presentation module to present the audio notification.

In Example 2, the subject matter of Example 1 may optionally include, wherein to determine the audio effect to apply to the audio notification, the audio effect module is to: determine an amount of unobstructed area of the background user interface component; determine a distance from the foreground layer; and construct the audio effect as a function of the amount of unobstructed area and the distance from the foreground layer.

In Example 3, the subject matter of any one or more of Examples 1 to 2 may optionally include, wherein the audio effect includes dampening an audio signal to reduce at least one of a volume or frequency range.

In Example 4, the subject matter of any one or more of Examples 1 to 3 may optionally include, wherein the volume is reduced by approximately 3 dB.

In Example 5, the subject matter of any one or more of Examples 1 to 4 may optionally include, wherein to reduce the frequency range, the audio effect includes a reduction in the slope of a low-pass filter by approximately 6 dB/octave.

In Example 6, the subject matter of any one or more of Examples 1 to 5 may optionally include, wherein the audio effect includes a reduction of the cut-off frequency of the low-pass filter by approximately 500 Hz.

In Example 7, the subject matter of any one or more of Examples 1 to 6 may optionally include, wherein the audio effect includes a reverberation or an echo.

In Example 8, the subject matter of any one or more of Examples 1 to 7 may optionally include, wherein the audio effect module is to: determine that the foreground user interface component has moved to a new position with respect to the background user interface component in the 3D parallax user interface; determine a revised audio effect to apply to the audio notification, the revised audio effect based on the new position; and apply the revised audio effect to the audio notification to obtain a revised audio notification; and wherein the audio presentation module is to present the revised audio notification.

In Example 9, the subject matter of any one or more of Examples 1 to 8 may optionally include, wherein the background layer is a wallpaper of the 3D parallax user interface.

In Example 10, the subject matter of any one or more of Examples 1 to 9 may optionally include, wherein the wallpaper includes a soundtrack, and wherein the audio effect module is to determine and apply an audio effect to apply to the soundtrack.

Example 11 includes subject matter for providing audio obstruction effects in 3D parallax user interfaces (such as a method, means for performing acts, machine readable medium including instructions that when performed by a machine cause the machine to performs acts, or an apparatus configured to perform) comprising: presenting a 3D parallax user interface on an electronic device, the 3D parallax user interface including a foreground layer and a background layer, the foreground layer having a foreground user interface component and the background layer having a background user interface component, the foreground user interface component obstructing at least a portion of the background user interface component; receiving a signal to generate an audio notification for the background user interface component; determining an audio effect to apply to the audio notification, the audio effect based on the position of the background user interface component in relation to the foreground user interface component; applying the audio effect to the audio notification; and presenting the audio notification.

In Example 12, the subject matter of Example 11 may optionally include, wherein determining the audio effect to apply to the audio notification comprises: determining an amount of unobstructed area of the background user interface component; determining a distance from the foreground layer; and constructing the audio effect as a function of the amount of unobstructed area and the distance from the foreground layer.

In Example 13, the subject matter of any one or more of Examples 11 to 12 may optionally include, wherein the audio effect includes dampening an audio signal to reduce at least one of a volume or frequency range.

In Example 14, the subject matter of any one or more of Examples 11 to 13 may optionally include, wherein the volume is reduced by approximately 3 dB.

In Example 15, the subject matter of any one or more of Examples 11 to 14 may optionally include, wherein to reduce the frequency range, the audio effect includes a reduction in the slope of a low-pass filter by approximately 6 dB/octave.

In Example 16, the subject matter of any one or more of Examples 11 to 15 may optionally include, wherein the audio effect includes a reduction of the cut-off frequency of the low-pass filter by approximately 500 Hz.

In Example 17, the subject matter of any one or more of Examples 11 to 16 may optionally include, wherein the audio effect includes a reverberation or an echo.

In Example 18, the subject matter of any one or more of Examples 11 to 17 may optionally include, determining that the foreground user interface component has moved to a new position with respect to the background user interface component in the 3D parallax user interface; determining a revised audio effect to apply to the audio notification, the revised audio effect based on the new position; applying the revised audio effect to the audio notification to obtain a revised audio notification; and presenting the revised audio notification.

In Example 19, the subject matter of any one or more of Examples 11 to 18 may optionally include, wherein the background layer is a wallpaper of the 3D parallax user interface.

In Example 20, the subject matter of any one or more of Examples 11 to 19 may optionally include, wherein the wallpaper includes a soundtrack, and wherein the method further comprises determining and applying an audio effect to apply to the soundtrack.

Example 21 includes a machine-readable medium including instructions for providing audio obstruction effects in 3D parallax user interfaces, which when executed by a machine, cause the machine to perform operations of any of Examples 11-20.

Example 22 includes an apparatus comprising means for performing any of Examples 11-20.

Example 23 includes an apparatus to provide audio obstruction effects in 3D parallax user interfaces comprising: means for presenting a 3D parallax user interface on an electronic device, the 3D parallax user interface including a foreground layer and a background layer, the foreground layer having a foreground user interface component and the background layer having a background user interface component, the foreground user interface component obstructing at least a portion of the background user interface component; means for receiving a signal to generate an audio notification for the background user interface component; means for determining an audio effect to apply to the audio notification, the audio effect based on the position of the background user interface component in relation to the foreground user interface component; means for applying the audio effect to the audio notification; and means for presenting the audio notification.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A non-transitory machine-readable medium including instructions for providing audio obstruction effects in 3D parallax user interfaces, which when executed by a machine, cause the machine to:

present a 3D parallax user interface on an electronic device, the 3D parallax user interface including a foreground layer and a background layer, the foreground layer having a foreground user interface component and the background layer having a background user interface component, the foreground user interface component obstructing at least a portion of the background user interface component;

receive a signal to generate an audio notification for the background user interface component;

determine an audio effect to apply to the audio notification, the audio effect based on the position of the background user interface component in relation to the foreground user interface component;
apply the audio effect to the audio notification; and
present the audio notification with the audio effect.

2. The non-transitory machine-readable medium of claim 1, wherein the instructions to determine the audio effect to apply to the audio notification comprise instructions to:
determine an amount of unobstructed area of the background user interface component;
determine a distance from the foreground layer; and
construct the audio effect as a function of the amount of unobstructed area and the distance from the foreground layer.

3. The non-transitory machine-readable medium of claim 1, wherein the audio effect includes dampening an audio signal to reduce at least one of a volume or frequency range.

4. The non-transitory machine-readable medium of claim 3, wherein the volume is reduced by approximately 3 dB.

5. The non-transitory machine-readable medium of claim 3, wherein to reduce the frequency range, the audio effect includes a reduction in the slope of a low-pass filter by approximately 6 dB/octave.

6. The non-transitory machine-readable medium of claim 5, wherein the audio effect includes a reduction of the cut-off frequency of the low-pass filter by approximately 500 Hz.

7. The non-transitory machine-readable medium of claim 1, wherein the audio effect includes a reverberation or an echo.

8. The non-transitory machine-readable medium of claim 1, further comprising instructions to:
determine that the foreground user interface component has moved to a new position with Respect to the background user interface component in the 3D parallax user interface;
determine a revised audio effect to apply to the audio notification, the revised audio effect based on the new position;
apply the revised audio effect to the audio notification to obtain a revised audio notification; and
present the revised audio notification.

9. The non-transitory machine-readable medium of claim 1, wherein the background layer is a wallpaper of the 3D parallax user interface.

10. The non-transitory machine-readable medium of claim 9, wherein the wallpaper includes a soundtrack, and wherein the machine-readable medium further comprises instructions to determine and apply an audio effect to apply to the soundtrack.

11. An apparatus to provide audio obstruction effects in 3D parallax user interfaces, the apparatus comprising:
a presentation circuit to present a 3D parallax user interface on an electronic device, the 3D parallax user interface including a foreground layer and a background layer, the foreground layer having a foreground user interface component and the background layer having a background user interface component, the foreground user interface component obstructing at least a portion of the background user interface component;
a receiving circuit to receive a signal to generate an audio notification for the background user interface component; and
an audio effect circuit to:
determine an audio effect to apply to the audio notification, the audio effect based on the position of the background user interface component in relation to the foreground user interface component;and
apply the audio effect to the audio notification; and
an audio presentation circuit to present the audio notification with the audio effect.

12. The apparatus of claim 11, wherein to determine the audio effect to apply to the audio notification, the audio effect circuit is to:
determine an amount of unobstructed area of the background user interface component;
determine a distance from the foreground layer; and
construct the audio effect as a function of the amount of unobstructed area and the distance from the foreground layer.

13. The apparatus of claim 11, wherein the audio effect includes dampening an audio signal to reduce at least one of a volume or frequency range.

14. The apparatus claim 13, wherein the volume is reduced by approximately 3 dB.

15. The apparatus of claim 13, wherein to reduce the frequency range, the audio effect includes a reduction in the slope of a low-pass filter by approximately 6 dB/octave.

16. A method for providing audio obstruction effects in 3D parallax user interfaces, the method comprising:
presenting a 3D parallax user interface on an electronic device, the 3D parallax user interface including a foreground layer and a background layer, the foreground layer having a foreground user interface component and the background layer having a background user interface component, the foreground user interface component obstructing at least a portion of the background user interface component;
receiving a signal to generate audio notification for the background user interface component;
determining an audio effect to apply to the audio notification, the audio effect based on the position of the background user interface component in relation to the foreground user interface component;
applying the audio effect to the audio notification; and
presenting the audio notification with the audio effect.

17. The method of claim 16, wherein the audio effect includes a reverberation or an echo.

18. The method of claim 16, further comprising:
determining that the foreground user interface component has moved to anew position with respect to the background user interface component in the 3D parallax user interface;
determining a revised audio effect to apply to the audio notification, the revised audio effect based on the new position;
applying the revised audio effect to the audio notification to obtain a revised audio notification; and
presenting the revised audio notification.

19. The method of claim 16, wherein the background layer is a wallpaper of the 3D parallax user interface.

20. The method of claim 19, wherein the wallpaper includes a soundtrack, and wherein the method further comprises determining and applying an audio effect to apply to the soundtrack.

* * * * *

UNITED STATES PATENT AND TRADEMARK OFFICE
CERTIFICATE OF CORRECTION

PATENT NO. : 9,720,645 B2
APPLICATION NO. : 14/368700
DATED : August 1, 2017
INVENTOR(S) : David Isherwood Page 1 of 1

It is certified that error appears in the above-identified patent and that said Letters Patent is hereby corrected as shown below:

In the Claims

In Column 11, Line 34, in Claim 8, delete "Respect" and insert --respect-- therefor In Column 12, Line 5, in Claim 11, delete "component;and" and insert --component; and-- therefor In Column 12, Line 22, in Claim 14, after "apparatus", insert --of--

In Column 12, Line 37, in Claim 16, after "generate", insert --an--

In Column 12, Line 49, in Claim 18, delete "anew" and insert --a new-- therefor

Signed and Sealed this
Eleventh Day of June, 2019

Andrei Iancu
*Director of the United States Patent and Trademark Office*